(12) United States Patent
Matsubara et al.

(10) Patent No.: US 8,203,290 B2
(45) Date of Patent: Jun. 19, 2012

(54) VIBRATING ELEMENT

(75) Inventors: Hiroki Matsubara, Daito (JP); Seiji Takemoto, Daito (JP); Tomohisa Hirai, Daito (JP); Manabu Murayama, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 506 days.

(21) Appl. No.: 12/421,301

(22) Filed: Apr. 9, 2009

(65) Prior Publication Data

US 2009/0284190 A1 Nov. 19, 2009

(30) Foreign Application Priority Data

May 15, 2008 (JP) ................... 2008-127969

(51) Int. Cl.
*H02K 33/00* (2006.01)
(52) U.S. Cl. ............... 318/114; 318/119; 318/128
(58) Field of Classification Search .......... 318/114, 318/119, 128; 310/340, 328; 73/862.59
See application file for complete search history.

(56) References Cited

U.S. PATENT DOCUMENTS

| | | | |
|---|---|---|---|
| 6,564,637 B1 | 5/2003 | Schalk et al. | |
| 2004/0008105 A1 | 1/2004 | Rota et al. | |
| 2004/0108824 A1 | 6/2004 | Ueda et al. | |
| 2004/0256921 A1 | 12/2004 | Turner et al. | |
| 2008/0106015 A1 | 5/2008 | Fushimi et al. | |
| 2011/0138931 A1* | 6/2011 | Hashiguchi | 73/862.59 |

FOREIGN PATENT DOCUMENTS

| | | |
|---|---|---|
| JP | 2001-305471 A | 10/2001 |
| JP | 2002-277809 A | 9/2002 |
| JP | 2004-242488 A | 8/2004 |
| JP | 3806826 B2 | 5/2006 |
| JP | 2007-151244 A | 6/2007 |

OTHER PUBLICATIONS

European Search report Dated Aug. 17, 2009 (seven (7) pages).

* cited by examiner

*Primary Examiner* — Karen Masih
(74) *Attorney, Agent, or Firm* — Crowell & Moring LLP (57) ABSTRACT

This vibrating element includes a movable portion driven to vibrate at a prescribed resonance frequency, a driving portion vibrating the movable portion by cyclically supplying a pulse signal and a detecting portion detecting the vibrational state of the movable portion, while the driving portion is so formed as to supply the pulse signal at a first frequency substantially identical to the resonance frequency of the movable portion at least in starting and to cyclically supply the pulse signal at a second frequency smaller than the first frequency in detection of the vibrational state of the movable portion.

20 Claims, 5 Drawing Sheets

VIBRATING ELEMENT

BACKGROUND OF THE INVENTION

1. Field of the Invention

The present invention relates to a vibrating element, and more particularly, it relates to a vibrating element including a movable portion driven to vibrate at a prescribed resonance frequency.

2. Description of the Background Art

A vibrating element including a movable portion driven to vibrate at a prescribed resonance frequency is known in general, as disclosed in each of Japanese Patent Laying-Open No. 2004-242488, Japanese Patent No. 3806826, Japanese Patent Laying-Open No. 2002-277809, Japanese Patent Laying-Open No. 2007-151244 and Japanese Patent Laying-Open No. 2001-305471, for example.

The aforementioned Japanese Patent Laying-Open No. 2004-242488 discloses an electromagnetic actuator including a movable portion, first and second coils provided on the movable portion, a permanent magnet working a magnetic field on the first and second coils, two driving portions provided for the first and second coils respectively and capable of supplying driving currents and a detecting portion detecting counter electromotive force generated in the second coil. The electromagnetic actuator described in Japanese Patent Laying-Open No. 2004-242488 regularly supplies the driving current to the first coil, and detects the counter electromotive force generated in the second coil with the detecting portion. The electromagnetic actuator is so formed as to control the magnitudes of the driving currents supplied from the driving portions for rendering the amplitude of the movable portion constant on the basis of the detected counter electromotive force.

The aforementioned Japanese Patent No. 3806826 discloses a vibrating mirror scanner driving circuit including a vibrating mirror (movable portion), a coil, a driving portion and a voltage sampler (detecting portion). In this vibrating mirror scanner driving circuit, the driving portion applies an excitation pulse voltage to the coil at a frequency twice the resonance frequency of the vibrating mirror. However, the excitation pulse voltage is applied every half cycle of the vibrating mirror driven at the resonance frequency by reversing the polarity every cycle. At this time, a counter electromotive voltage resulting from vibration of the vibrating mirror is generated from the coil. The voltage sampler detects the counter electromotive voltage only in a period when the excitation pulse voltage applied every half cycle of the resonance frequency is not applied. The vibrating mirror scanner driving circuit described in Japanese Patent No. 3806826 is so formed as to decide a pulse rise time and a pulse fall time of the excitation pulse voltage on the basis of the detected counter electromotive voltage.

The aforementioned Japanese Patent Laying-Open No. 2002-277809 discloses a planar galvanomirror driving circuit including a planar galvanomirror, a pulse generating portion, a current setting portion and a counter electromotive force detecting portion. In this planar galvanomirror driving circuit, the pulse generating portion and the current set portion supply a pulse current matched with a target mirror rotation angle to the planar galvanomirror at a resonance frequency. When the planar galvanomirror vibrates due to this pulse current, counter electromotive force is generated in a coil of the planar galvanomirror. The counter electromotive force detecting portion is so formed as to detect this counter electromotive force. At this time, the planar galvanomirror performs pulse driving, and hence the first and second halves of a waveform detected by the counter electromotive force detecting portion have a pulse waveform and a counter electromotive force waveform respectively. The planar galvanomirror driving circuit described in Japanese Patent Laying-Open No. 2002-277809 is enabled to drive the planar galvanomirror by generating the pulse current in timing with a zero crossing point where positive and negative signs of the counter electromotive force waveform in the second half of the detective waveform are reversed.

The aforementioned Japanese Patent Laying-Open No. 2007-151244 discloses an electromagnetic actuator including a movable portion, a driving coil provided on the movable portion, a permanent magnet working a magnetic field on the driving coil, a driving pulse generation circuit and a synchronous timing detector detecting counter electromotive force generated in the driving coil while detecting a zero crossing position of the waveform of the detected counter electromotive force as synchronous timing. In this electromagnetic actuator, the waveforms of the counter electromotive force and a driving pulse supplied by the driving pulse generation circuit are mixed in a signal waveform detected by the synchronous timing detector. In the electromagnetic actuator described in Japanese Patent Laying-Open No. 2007-151244, the synchronous timing detector is enabled to extract only the counter electromotive force waveform by removing the driving pulse waveform mixed into the counter electromotive force waveform by a canceling pulse of an opposite phase synchronous with the driving pulse waveform and performing prescribed correction processing and removal of noise.

The aforementioned Japanese Patent Laying-Open No. 2001-305471 discloses an electromagnetic actuator including a movable portion, a coil mounted on the movable portion, a permanent magnet working a magnetic field on the coil, a driving portion supplying a pulse excitation current to the coil and a detecting portion detecting counter electromotive force generated in the coil. A signal obtained by adding up the pulse excitation current and the counter electromotive force generated in the coil is input in the detecting portion. In this electromagnetic actuator, the detecting portion can detect only the counter electromotive force in a non-supply time (OFF-state) of the excitation pulse current, and hence generates a voltage value for excitation timing by detecting a negative peak value of a detected voltage waveform, reversing the sign and multiplying the same by a prescribed coefficient. The driving portion is enabled to supply the pulse excitation current at a frequency matched with a resonance frequency by supplying the pulse excitation current at timing matched with the voltage value for the excitation timing. Thus, the electromagnetic actuator described in Japanese Patent Laying-Open No. 2001-305471 is enabled to acquire timing for resonantly driving the electromagnetic actuator while avoiding influence by the excitation current by detecting the negative peak value of the counter electromotive force in the non-supply time of the pulse excitation current supplied at the resonance frequency.

In the electromagnetic actuator described in the aforementioned Japanese Patent Laying-Open No. 2004-242488, however, two coils, i.e., the first coil regularly continuously supplying the driving current and the second coil for detecting the counter electromotive force must be provided, in order to detect the counter electromotive force generated due to the vibration of the movable portion. Further, the two driving portions are also required for supplying the driving currents to the two coils. Therefore, the structure of the electromagnetic actuator is disadvantageously complicated.

In the vibrating mirror scanner driving circuit described in the aforementioned Japanese Patent No. 3806826, the voltage sampler can detect the counter electromotive voltage only in the period where the excitation pulse voltage is not applied in each half cycle of the vibrating mirror driven at the resonance frequency, and hence a detectable period for the vibrational state of the vibrating mirror is conceivably disadvantageously short.

In the planar galvanomirror driving circuit described in the aforementioned Japanese Patent Laying-Open No. 2002-277809, the counter electromotive force waveform can be acquired only in the second half of the waveform detected by the counter electromotive force detecting portion (second half of the resonantly driven vibration), and hence a detectable period for the vibrational state of the planar galvanomirror is disadvantageously short.

In the electromagnetic actuator described in the aforementioned Japanese Patent Laying-Open No. 2007-151244, waveform processing circuits such as a noise removing circuit and a waveform correction circuit are required in order to extract only the counter electromotive force waveform, and hence the structure of the electromagnetic actuator for detecting the vibrational state of the movable portion is disadvantageously complicated.

In the electromagnetic actuator described in the aforementioned Japanese Patent Laying-Open No. 2001-305471, the vibrational state of the movable portion can be detected only in the non-supply time of the pulse excitation current supplied at the resonance frequency, and hence a detectable period for the vibrational state of the vibrating mirror is conceivably disadvantageously short.

SUMMARY OF THE INVENTION

The present invention has been proposed in order to solve the aforementioned problems, and an object of the present invention is to provide a vibrating element capable of suppressing complication of the structure of the vibrating element and extending a detection period for the vibrational state of a movable portion.

A vibrating element according to a first aspect of the present invention comprises a movable portion driven to vibrate at a prescribed resonance frequency, a driving portion vibrating the movable portion by cyclically supplying a pulse signal and a detecting portion detecting the vibrational state of the movable portion, while the driving portion is so formed as to supply the pulse signal at a first frequency substantially identical to the resonance frequency of the movable portion at least in starting and to cyclically supply the pulse signal at a second frequency smaller than the first frequency in detection of the vibrational state of the movable portion.

In the vibrating element according to the first aspect, as hereinabove described, the driving portion is so formed as to cyclically supply the pulse signal at the second frequency smaller than the first frequency substantially identical to the resonance frequency of the movable portion in detection of the vibrational state of the movable portion, whereby the interval (cycle) for supplying the pulse signal in detection of the vibrational state of the movable portion can be widened beyond the cycle of the resonance frequency of the movable portion. Thus, the period for detecting the vibrational state of the movable portion can be lengthened as compared with a case of detecting the vibrational state in a supply interval for the pulse signal at the first frequency substantially identical to the resonance frequency of the movable portion. Further, the period for detecting the vibrational state of the movable portion can be lengthened by simply supplying the pulse signal at the second frequency smaller than the first frequency, whereby complication of the structure of the vibrating element can be suppressed.

In the aforementioned vibrating element according to the first aspect, the second frequency is preferably a frequency allowing detection of the vibrational state of the movable portion for at least one cycle. According to this structure, the overall shape of the vibration waveform for one cycle can be acquired by detecting the vibrational state of the movable portion for one cycle. Thus, the vibrational state of the movable portion can be more correctly detected.

The aforementioned vibrating element according to the first aspect preferably further comprises a magnetic field generating portion generating a magnetic field and a single driving coil arranged in the magnetic field and supplied with the pulse signal by the driving portion thereby vibrating the movable portion, and the detecting portion is preferably so formed as to detect the vibrational state of the movable portion by detecting counter electromotive force generated in the single driving coil due to vibration of the movable portion in the magnetic field in a non-supply period of the pulse signal while the pulse signal is supplied to the single driving coil at the second frequency in detection of the vibrational state of the movable portion. According to this structure, a detectable period for the counter electromotive force can be extended beyond the cycle of the resonance frequency of the movable portion by supplying the pulse signal to the single driving coil at the second frequency smaller than the first frequency substantially identical to the resonance frequency of the movable portion, whereby the vibrational state of the movable portion can be easily detected.

In the aforementioned structure where the second frequency is the frequency allowing detection of the vibrational state of the movable portion for at least one cycle, the second frequency is preferably substantially 1/n (n: integer of at least two) of the first frequency. According to this structure, the pulse signal is supplied at the second frequency once in n cycles of the first frequency substantially identical to the resonance frequency of the movable portion, whereby the cycle of the supplied pulse signal is integral times (at least twice) the cycle of the resonance frequency of the movable portion. Thus, the detectable period for the vibrational state of the movable portion completely includes one cycle in resonance vibration while the pulse signal is supplied synchronously with the resonance vibration. Thus, the overall shape of the vibration waveform of the movable portion for one cycle can be acquired while maintaining the resonance vibration of the movable portion at the first frequency.

In this case, the second frequency is preferably substantially half the first frequency. According to this structure, the pulse signal is supplied at the second frequency once in two cycles of the first frequency substantially identical to the resonance frequency of the movable portion, whereby the cycle of the supplied pulse signal is twice the cycle of the resonance frequency of the movable portion. Thus, reduction in the supply of the pulse signal upon change from the first frequency to the second frequency can be suppressed as compared with a case of changing the second frequency to ⅓ or ¼ of the first frequency while supplying the pulse signal synchronous with the resonance vibration, and the detectable period for the vibrational state of the movable portion can completely include one cycle in the resonance vibration. Consequently, the overall shape of the vibration waveform of the movable portion for one cycle can be acquired while simplifying maintenance of the resonance vibration of the movable portion at the first frequency.

In the aforementioned vibrating element according to the first aspect, the driving portion is preferably so formed as to supply the pulse signal with a second pulse width having a larger time width than a first pulse width of the pulse signal supplied at the first frequency in detection of the vibrational state of the movable portion. According to this structure, the supply of the pulse signal reduced when supplied at the second frequency as compared with the case where the same is supplied at the first frequency substantially identical to the resonance frequency of the movable portion can be compensated by broadening the pulse width beyond the first pulse width. Thus, the detection period for the vibrational state can be extended while suppressing reduction in the amplitude of the movable portion resulting from the pulse signal supplied at the second frequency.

In this case, the driving portion is preferably so formed as to supply the pulse signal with the second pulse width having a time width of not more than substantially half the vibration cycle of the movable portion in detection of the vibrational state of the movable portion. According to this structure, the pulse signal is not supplied beyond half the vibration cycle of the movable portion also when the pulse width is enlarged to the second pulse width, whereby no such inconvenience is caused that vibration of the movable portion is suppressed due to the pulse signal supplied beyond half the vibration cycle of the movable portion. Thus, the amplitude can be easily maintained in detection of the vibrational state of the movable portion.

In the aforementioned structure of supplying the pulse signal with the second pulse width in detection of the vibrational state of the movable portion, the second pulse width preferably has a time width for vibrating the movable portion with amplitude substantially identical to the amplitude of vibration of the movable portion in the case of supplying the pulse signal of the first pulse width to the movable portion at the first frequency when supplying the pulse signal of the second pulse width to the movable portion at the second frequency in a detection period for the vibrational state of the movable portion. According to this structure, vibrational amplitude substantially identical to the amplitude in the resonance vibration of the movable portion supplied with the pulse signal at the first frequency can be maintained also in the detection period for the vibrational state of the movable portion supplied with the pulse signal at the second frequency. Thus, the vibrational amplitude of the movable portion can be inhibited from changing in detection of the vibrational state of the movable portion supplied with the pulse signal at the second frequency.

In the aforementioned vibrating element according to the first aspect, the detecting portion is preferably so formed as to detect the vibrational state of the movable portion after vibration of the movable portion is stabilized at the first frequency after starting. According to this structure, the detection can be performed after shifting the vibrational state of the movable portion to a stable resonance state (vibration at the first frequency) without detecting the instable vibrational state of the movable portion in starting.

In this case, the detecting portion is preferably so formed as to detect the vibrational state of the movable portion after a lapse of a prescribed initial driving time from the start of supply of the pulse signal at the first frequency after starting. According to this structure, the vibrational state of the movable portion can be easily detected after shifting the vibrational state of the movable portion to a stable resonance state (vibration at the first frequency) by driving the movable portion at the first frequency until the prescribed initial driving time elapses.

In the aforementioned structure of detecting the vibrational state of the movable portion after a lapse of the prescribed initial driving time, the vibrating element preferably further comprises a driving control portion controlling the driving portion, and the driving control portion is preferably so formed as to determine whether or not the prescribed initial driving time has elapsed for controlling the driving portion to switch the supply of the pulse signal to the movable portion from the first frequency to the second frequency when the prescribed initial driving time has elapsed. According to this structure, the driving portion can easily switch the supply of the pulse signal from the first frequency to the second frequency on the basis of the determination of the driving control portion as to whether or not the prescribed initial driving time has elapsed.

In the aforementioned structure further comprising the driving control portion controlling the driving portion, the driving control portion is preferably so formed as to determine whether or not the first frequency deviates from the resonance frequency of the movable portion on the basis of a result of detection of the vibrational state of the movable portion during supply of the pulse signal at the second frequency for matching the first frequency with the resonance frequency of the movable portion when the first frequency deviates from the resonance frequency of the movable portion. According to this structure, the first frequency can be matched with the (changed) resonance frequency of the movable portion on the basis of the result of the vibrational state of the movable portion during supply of the pulse signal at the second frequency having a long detection period when the resonance frequency is changed due to temperature change or the like in driving of the vibrating element and the vibrational amplitude of the movable portion is reduced, whereby the vibration of the movable portion can be maintained in the resonance state also when the resonance frequency is changed due to temperature change or the like.

In this case, the driving control portion is preferably so formed as to repeat detection of the vibrational state of the movable portion during supply of the pulse signal at the second frequency and matching of the first frequency with the resonance frequency of the movable portion every lapse of a prescribed time. According to this structure, the vibrational state of the movable portion can be periodically detected every lapse of the prescribed time and the first frequency for supplying the pulse signal can be matched with the resonance frequency also when the resonance frequency of the movable portion is changed due to temperature change or the like and the vibrational state of the movable portion is changed in continuation of the driving of the vibrating element. Thus, the vibrational state of the movable portion can be maintained in the resonance state also in continuation of the driving of the vibrating element.

In the aforementioned vibrating element according to the first aspect, the movable portion preferably includes a mirror integrally vibrating with the movable portion thereby changing an angle of reflection of applied light. According to this structure, the vibrating element can function as a vibrating mirror apparatus capable of scanning an object with reflected light by reflecting the light emitted from a light source with the mirror of the vibrating movable portion while changing the direction of reflection.

A method of controlling vibration of a vibrating element according to a second aspect of the present invention comprises the steps of supplying a pulse signal at a first frequency substantially identical to a resonance frequency of a movable portion at least in starting and detecting the vibrational state of the movable portion while cyclically supplying the pulse signal at a second frequency smaller than the first frequency.

As hereinabove described, the method of controlling vibration of a vibrating element according to the second aspect comprises the step of detecting the vibrational state of the movable portion while cyclically supplying the pulse signal at the second frequency smaller than the first frequency substantially identical to the resonance frequency of the movable portion, whereby the interval (cycle) for supplying the pulse signal in detection of the vibrational state of the movable portion can be widened beyond the cycle of the resonance frequency of the movable portion. Thus, the period for detecting the vibrational state of the movable portion can be lengthened as compared with a case of detecting the vibrational state in a supply interval for the pulse signal at the first frequency substantially identical to the resonance frequency of the movable portion.

In the aforementioned method of controlling vibration of a vibrating element according to the second aspect, the second frequency is preferably a frequency allowing detection of the vibrational state of the movable portion for at least one cycle. According to this structure, the overall shape of the vibration waveform for one cycle can be acquired by detecting the vibrational state of the movable portion for one cycle. Thus, the vibrational state of the movable portion can be more correctly detected.

In the aforementioned structure where the second frequency is the frequency allowing detection of the vibrational state of the movable portion for at least one cycle, the second frequency is preferably substantially 1/n (n: integer of at least two) of the first frequency. According to this structure, the pulse signal is supplied at the second frequency once in n cycles of the first frequency substantially identical to the resonance frequency of the movable portion, whereby the cycle of the supplied pulse signal is integral times (at least twice) the cycle of the resonance frequency of the movable portion. Thus, the detectable period for the vibrational state of the movable portion completely includes one cycle in resonance vibration while the pulse signal is supplied synchronously with the resonance vibration. Thus, the overall shape of the vibration waveform of the movable portion for one cycle can be acquired while maintaining the resonance vibration of the movable portion at the first frequency.

In this case, the second frequency is preferably substantially half the first frequency. According to this structure, the pulse signal is supplied at the second frequency once in two cycles of the first frequency substantially identical to the resonance frequency of the movable portion, whereby the cycle of the supplied pulse signal is twice the cycle of the resonance frequency of the movable portion. Thus, reduction in the supply of the pulse signal upon change from the first frequency to the second frequency can be suppressed as compared with a case of changing the second frequency to 1/3 or 1/4 of the first frequency while supplying the pulse signal synchronous with the resonance vibration, and the detectable period for the vibrational state of the movable portion can completely include one cycle in the resonance vibration. Consequently, the overall shape of the vibration waveform of the movable portion for one cycle can be acquired while simplifying maintenance of the resonance vibration of the movable portion at the first frequency.

In the aforementioned method of controlling vibration of a vibrating element according to the second aspect, the step of detecting the vibrational state of the movable portion preferably includes a step of detecting the vibrational state of the movable portion while supplying the pulse signal with a second pulse width having a larger time width than a first pulse width of the pulse signal supplied at the first frequency. According to this structure, the supply of the pulse signal (pulse supply frequency) reduced when supplied at the second frequency as compared with the case where the same is supplied at the first frequency substantially identical to the resonance frequency of the movable portion can be compensated by broadening the pulse width beyond the first pulse width. Thus, the detection period for the vibrational state can be lengthened while suppressing reduction in the amplitude of the movable portion resulting from the pulse signal supplied at the second frequency.

In this case, the step of detecting the vibrational state of the movable portion preferably includes a step of detecting the vibrational state of the movable portion while supplying the pulse signal with the second pulse width having a time width of not more than substantially half the vibration cycle of the movable portion. According to this structure, the pulse signal is not supplied beyond half the vibration cycle of the movable portion also when the pulse width is enlarged to the second pulse width, whereby no such inconvenience is caused that vibration of the movable portion is suppressed due to the pulse signal supplied beyond half the vibration cycle of the movable portion. Thus, the amplitude can be easily maintained in detection of the vibrational state of the movable portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

First, the structure of an electromagnetically driven mirror 100 according to the embodiment of the present invention is described with reference to FIGS. 1 to 4. According to this embodiment, the present invention is applied to the electromagnetically driven mirror 100 employed as an exemplary vibrating element.

Figure 1:
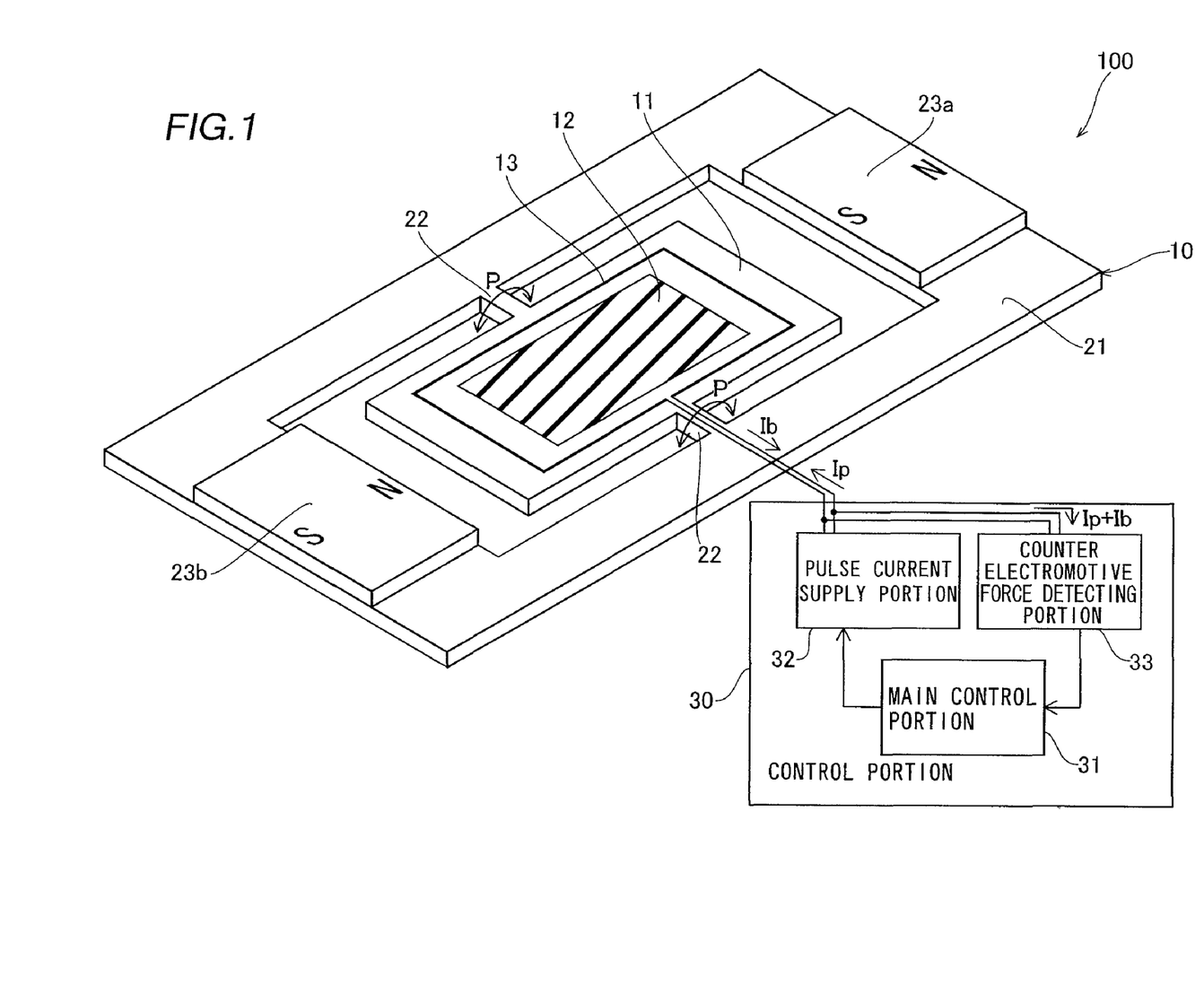
FIG. 1 is a schematic diagram showing the overall structure of an electromagnetically driven mirror according to an embodiment of the present invention.

As shown in FIG. 1, the electromagnetically driven mirror 100 according to the embodiment of the present invention is constituted of a mirror body portion 10 and a control portion 30.

The mirror body portion 100 of the electromagnetically driven mirror 100 is constituted of a movable portion 11 having a mirror 12 mounted on the central portion thereof and a fixed portion 21 rotatably supporting the movable portion 11 through a pair of rotating shafts 22, as shown in FIG. 1. The movable portion 11, the rotating shafts 22 and the fixed portion 21 are integrally formed. The electromagnetically driven mirror 100 resonantly vibrates the movable portion 11 around the rotating shafts 22 by supplying a pulse current Ip of a prescribed frequency from the control portion 30 to the mirror body portion 10. Thus, the electromagnetically driven mirror 100 scans an object with a laser beam or the like by changing the direction of reflection of the laser beam or the like applied to the mirror 12 arranged on the movable portion 11. The pulse current Ip is an example of the "pulse signal" in the present invention.

The movable portion 11 of the mirror body portion 10 is in the form of a rectangular flat plate in plan view. The movable portion 11 is supported by the pair of rotating shafts 22 on central portions of the long sides thereof opposed to each other. The movable portion 11 is so formed that restoring force of the rotating shafts 22 acts when the same rotates along arrow P around the rotating shafts 22. Thus, the movable portion 11 is so formed as to perform vibrational movement of repeating the rotation along arrow P around the rotating shafts 22 with prescribed vibrational amplitude.

The movable portion 11 is provided with the mirror 12 having a rectangular shape corresponding to the shape of the movable portion 11 at the central portion thereof. When light is applied to the mirror 12, the mirror 12 changes the angle of reflection due to the vibration of the movable portion 11. Thus, the object can be scanned with the light applied to the mirror 12.

A driving coil 13 is mounted on the outer periphery of the movable portion 12, to enclose the mirror 12. This driving coil 13 is connected to the control portion 30. When supplied with a prescribed current in a state arranged in a magnetic field, the driving coil 13 generates Lorentz force due to the current flowing therein. Thus, the driving coil 13 is supplied with the pulse current Ip by the control portion 30 in the magnetic field to generate the Lorentz force, thereby rotating the movable portion 11 around the rotating shafts 22.

The fixed portion 21 supporting the movable portion 11 includes the pair of rotating shafts 22 as well as a pair of permanent magnets 23a and 23b. The permanent magnets 23a and 23b are examples of the "magnetic field generating portion" in the present invention respectively.

The fixed portion 21 is in the form of a quadrilateral frame enclosing the movable portion 11, and has a flat plate shape. The fixed portion 21 supports the movable portion 11 arranged on the center from both sides through the pair of rotating shafts 22 at the central portions of the long sides thereof opposed to each other. On the other hand, the pair of permanent magnets 23a and 23b are mounted on the short sides of the fixed portion 21.

The rotating shafts 22 of the fixed portion 21 support the movable portion 11 to be rotatable along arrow P around the rotating shafts 22. The rotating shafts 22 are so formed as to generate the restoring force by torsion when the movable portion 11 is rotated by the Lorentz force generated by the pulse current Ip flowing in the driving coil 13. When the pulse current Ip is supplied to the driving coil 13, therefore, the movable portion 11 starts rotating clockwise around the rotating shafts 22, and rotates up to an angle balanced with the torsional restoring force of the rotating shafts 22. When balanced with the restoring force of the rotating shafts 22 to stop rotating, the movable portion 11 thereafter starts rotating anticlockwise due to the restoring force of the rotating shafts 22. When exceeding the initial state (the state shown in FIG. 1) due to the anticlockwise rotation, the movable portion 11 further continuously freely vibrates due to inertia. At this time, the rotating shafts 22 generate clockwise restoring force with respect to the movable portion 11. When the pulse current Ip is supplied to the driving coil 13 at prescribed timing during the rotation of the movable portion 11, the movable portion 11 is rotated by the Lorentz force again, to continue the vibration. The movable portion 11 is so formed as to resonantly vibrate around the rotating shafts 22 by repeating this.

The pair of permanent magnets 23a and 23b mounted on the opposed short sides of the fixed portion 21 respectively are so arranged that antipolar magnetic poles thereof are opposed to each other. The pair of permanent magnets 23a and 23b are so formed as to generate the magnetic field acting on the driving coil 13. The driving coil 13 arranged in the magnetic field generated by the permanent magnets 23a and 23b is so supplied with the pulse current Ip as to generate the Lorentz force. After the movable portion 11 starts vibrating due to the pulse current Ip supplied to the driving coil 13, the driving coil 13 vibrates in the magnetic field following the free vibration of the movable portion 11 in a non-supply period of the pulse current Ip, thereby generating counter electromotive force. In the free vibration of the movable portion 11 (the non-supply period of the pulse current Ip), a counter electromotive force signal (induced current) Ib is generated in the driving coil 13 due to the counter electromotive force. The counter electromotive force signal Ib is an example of the "counter electromotive force" in the present invention.

The control portion 30 of the electromagnetically driven mirror 100 is constituted of a main control portion 31, a pulse current supply portion 32 and a counter electromotive force detecting portion 33, as shown in FIG. 1. The pulse current supply portion 32 and the counter electromotive force detecting portion 33 of the control portion 30 are connected with the driving coil 13 of the movable portion 11 respectively. The control portion 30 is so formed as to control the vibration of the movable portion 11 around the rotating shafts 22 by controlling the current supplied to the driving coil 13. The main control portion 31, the pulse current supply portion 32 and the counter electromotive force detecting portion 33 are examples of the "driving control portion", the "driving portion" and the "detecting portion" in the present invention respectively.

The main control portion 31 of the control portion 30 is so formed as to control the frequency and the pulse width of the pulse current Ip supplied from the pulse current supply portion 32 to the driving coil 13 and the timing for supplying the pulse current Ib by transmitting a control signal to the pulse current supply portion 32. The main control portion 31 receives the detected counter electromotive force signal Ib from the counter electromotive force detecting portion 33, and generates the control signal for the pulse current supply portion 32 on the basis of the waveform of the received counter electromotive force signal Ib. Thus, the main control portion 31 is so formed as to control the vibration of the movable portion 11 of the electromagnetically driven mirror 100 through the pulse current supply portion 32 and the counter electromotive force detecting portion 33. A specific operation of the main control portion 31 controlling the vibration of the movable portion 11 is described later.

Figure 2:
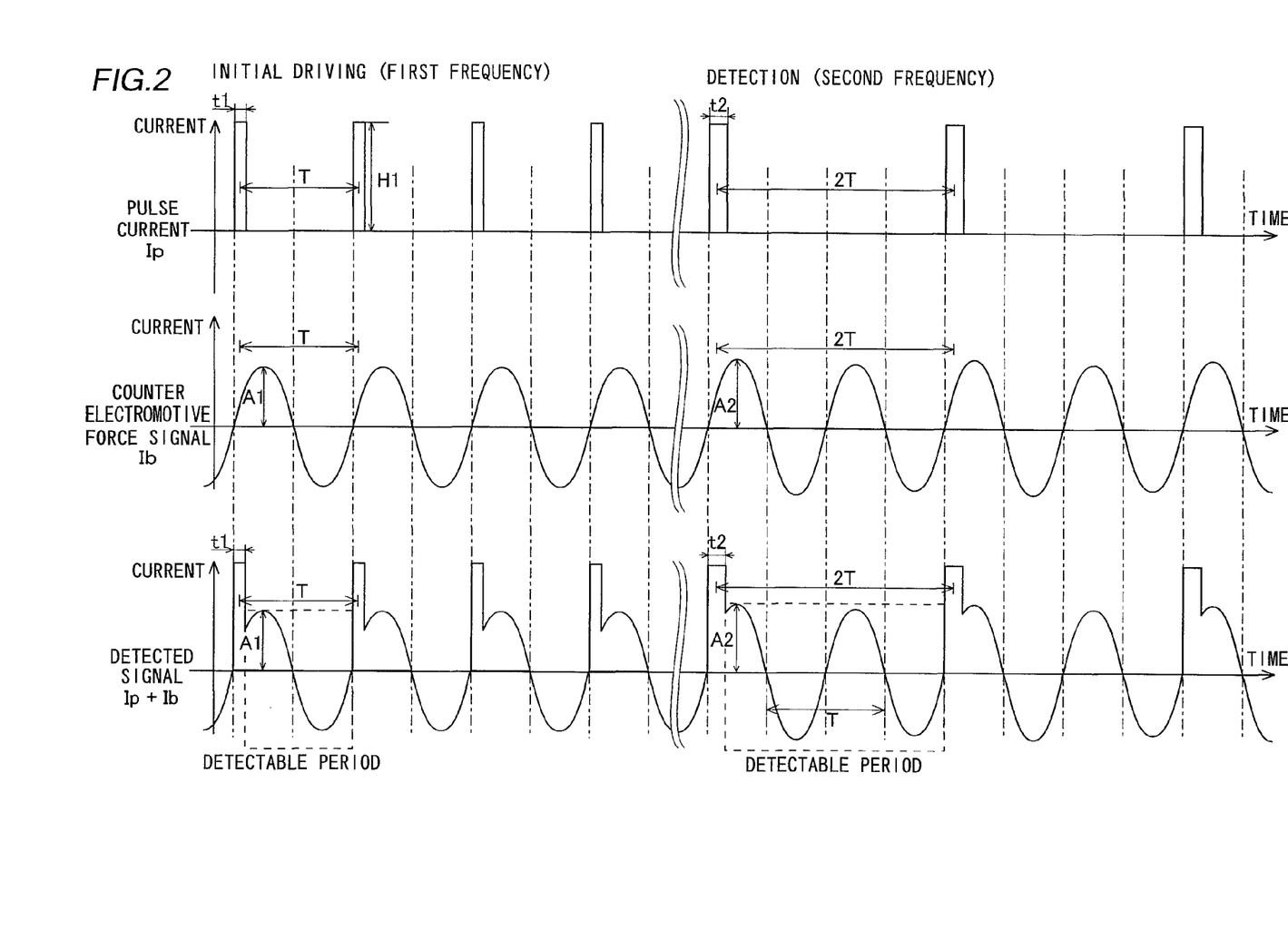
FIG. 2 is a schematic diagram for illustrating the waveforms of a pulse current and a counter electromotive force signal in the electromagnetically driven mirror according to the embodiment of the present invention.

The pulse current supply portion 32 is so formed as to supply the prescribed pulse current Ip to the driving coil 13 on the basis of the control signal from the main control portion 31. The pulse current Ip is supplied at a first frequency f1 (cycle T1) substantially equal to the resonance frequency of the movable portion 11 at least in starting, as shown in FIG. 2. At this time, the pulse current supply portion 32 supplies the pulse current Ip with a prescribed first pulse width t1 having a time width corresponding to previously set vibrational amplitude of the movable portion 11. The movable portion 11 is so formed as to perform resonance vibration around the rotating shafts 22 due to the pulse current Ip. Thus, the electromagnetically driven mirror 100 is driven at the resonance frequency, and hence enabled to obtain large vibrational amplitude with small power.

According to this embodiment, the pulse current supply portion 32 is so formed as to supply the pulse current p to the driving coil 13 at a second frequency f2 smaller than the first frequency f1 on the basis of the control signal from the main control portion 31 in detection of the counter electromotive force signal Ib. At this time, the supplied pulse current Ip has a second pulse width t2 larger than the first pulse width t1.

According to this embodiment, the counter electromotive force detecting portion 33 is so formed as to detect the counter electromotive force signal Ib generated in the driving coil 13 in the non-supply period of the pulse current Ip. When vibrating due to the pulse current Ip supplied to the driving coil 13 at the first frequency f1, the movable portion 11 continues the vibration (free vibration) by inertia also in the non-supply period of the pulse current Ip. In the non-supply period of the pulse current Ip, the driving coil 13 moves in the magnetic field following the inertial free vibration of the movable portion 11 to generate counter electromotive force, and the counter electromotive force signal Ib resulting from this counter electromotive force flows in the driving coil 13. The counter electromotive force detecting portion 33 is so formed as to detect this counter electromotive force signal Ib. The details of the detection of the counter electromotive force signal Ib are described later.

According to this embodiment, the generated counter electromotive force signal Ib results from the free vibration of the movable portion 11 performing the resonance vibration, and hence has a frequency equal to the resonance frequency of the movable portion 11 and a sinusoidal vibration waveform, as shown in FIG. 2. The counter electromotive force detecting portion 33 is so formed as to detect the vibrational state of the movable portion 11 by detecting the counter electromotive force signal Ib. Further, the counter electromotive force detecting portion 33 is so formed as to output the detected counter electromotive force signal Ib to the main control portion 31.

When the electromagnetically driven mirror 100 continues resonance driving by continuously supplying the pulse current Ip at the first frequency f1, the resonance frequency of the movable portion 11 is changed due to temperature change or the like. Therefore, the first frequency f1 for supplying the pulse current Ip and the resonance frequency of the movable portion 11 so deviate from each other that the resonance vibration of the movable portion 11 cannot be maintained, and the vibrational amplitude of the movable portion 11 is reduced. According to this embodiment, therefore, the main control portion 31 acquires the actual vibration frequency and the vibrational amplitude of the movable portion 11 and a phase deviation from the supplied pulse current Ip from the vibration waveform of the counter electromotive force signal Ib output from the counter electromotive force detecting portion 33. The main control portion 31 is so formed as to perform feedback control of matching the frequency (the first frequency f1) of the supplied pulse current Ip with the change in the resonance frequency of the movable portion 11 every lapse of a prescribed time on the basis of the obtained vibration frequency of the movable portion 11 and the phase deviation.

Figure 3:
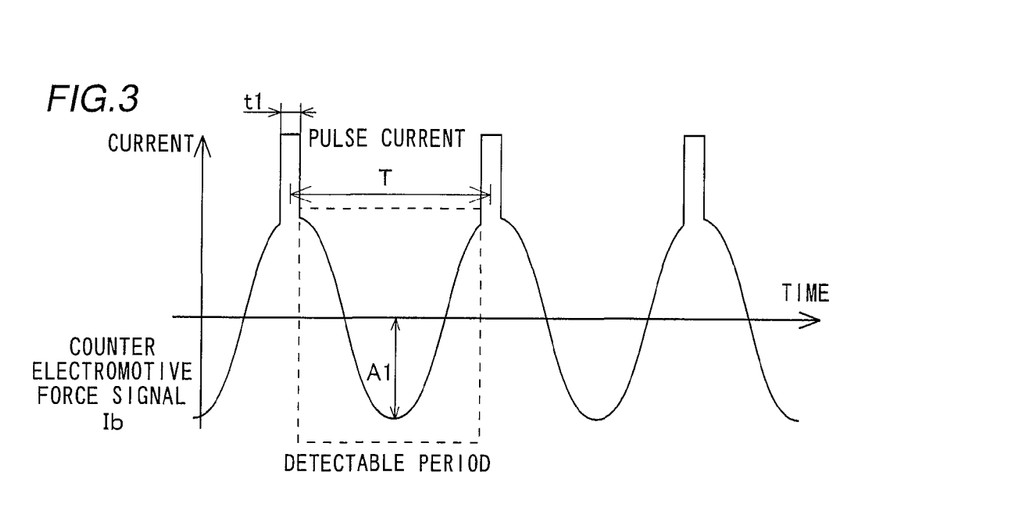
FIG. 3 is a diagram for illustrating detection of the counter electromotive force signal waveform at a first frequency in the electromagnetically driven mirror according to the embodiment of the present invention.

The generation path of the detected counter electromotive force signal Ib coincides with the supply path of the pulse current Ip, as shown in FIG. 1. Therefore, the pulse current Ip and the counter electromotive force signal Ib are mixed in a signal waveform detected by the counter electromotive force detecting portion 33 as described in FIG. 2, and hence the counter electromotive force signal Ib can be detected only in the non-supply period of the pulse current Ip. When the pulse current Ip is supplied at the first frequency f1 to resonantly vibrate the movable portion 11, therefore, the pulse current Ip and the counter electromotive force signal Ib have the same cycle T and hence the overall shape of the signal waveform of the counter electromotive force signal Ib for one cycle cannot be acquired. If the supply timing for the pulse current Ip and the position of a peak of the counter electromotive force signal Ib overlap with each other as shown in FIG. 3 due to a deviation of the resonance frequency of the movable portion 11 resulting from temperature change, for example, the main control portion 31 cannot correctly acquire the peak of the counter electromotive force signal Ib but causes a detection error.

According to this embodiment, therefore, the supply frequency for the supplied pulse current Ip is changed in order to reliably detect the counter electromotive force signal Ib. In initial driving of the electromagnetically driven mirror 100, the pulse current Ip is supplied at the first frequency f1 substantially identical to the resonance frequency of the movable portion 11 to resonantly vibrate the movable portion 11, as shown in FIG. 2. When the vibrational state of the movable portion 11 is stabilized, the supply of the pulse current Ip is changed from the first frequency f1 to the second frequency f2, and the counter electromotive force signal Ib is detected. The initial driving is a period up to a lapse of a prescribed initial driving time for stabilizing the vibration of the movable portion 11 at the first frequency f1 after starting of the electromagnetically driven mirror 100, and this initial driving time is previously set in the main control portion 31. In detection of the counter electromotive force signal Ib, the pulse current supply portion 32 supplies the pulse current Ip at the second frequency f2 on the basis of the control signal from the main control portion 31, as shown in FIG. 1. The second frequency f2 is half the first frequency f1. The pulse current supply portion 32 supplies the pulse current Ip at the second frequency f2, whereby the interval (cycle) for supplying the pulse current Ip is doubled. At this time, the pulse current Ip is supplied to the movable portion 11 resonantly vibrating at the first frequency f1 (cycle T) once in two cycles of the resonance vibration. Thus, the movable portion 11 can continue the resonance vibration due to the pulse current Ip, synchronous with the resonance vibration, supplied once in two cycles, whereby a detectable period for the counter electromotive force signal Ib (the non-supply period of the pulse current Ip) can be extended while maintaining the resonance vibration of the movable portion 11. In the non-supply period of the pulse current Ip, the movable portion 11 performs the free vibration to generate the counter electromotive force signal Ib vibrating at the resonance frequency (cycle T) as shown in FIG. 2, whereby the overall shape of the vibration waveform (cycle T) of the counter electromotive force signal Ib for one cycle can be reliably acquired with no detection error by supplying the pulse current Ip at the second frequency f2 (cycle 2T).

When the counter electromotive force detecting portion 33 detects the overall waveform of the counter electromotive force signal Ib for one cycle while the pulse current Ip is supplied at the second frequency f2, the main control portion 31 acquires the resonance frequency of the movable portion 11 from the waveform of the counter electromotive force signal Ib. When the resonance frequency of the movable portion 11 and the first frequency f1 deviate from each other due to temperature change or the like, the main control portion 31 changes the first frequency f1 to match the same with the resonance frequency of the movable portion 11. When the detection of the counter electromotive force signal Ib and the change of the first frequency f1 to the resonance frequency of the movable portion 11 are terminated, the main control portion 31 returns the supply of the pulse current Ip by the pulse current supply portion 32 from the second frequency f2 to the first frequency f1. Thus, the electromagnetically driven mirror 100 according to this embodiment is enabled to supply the pulse current Ip while regularly matching the resonance frequency of the movable portion 11 and the first frequency f1 with each other.

Figure 4:
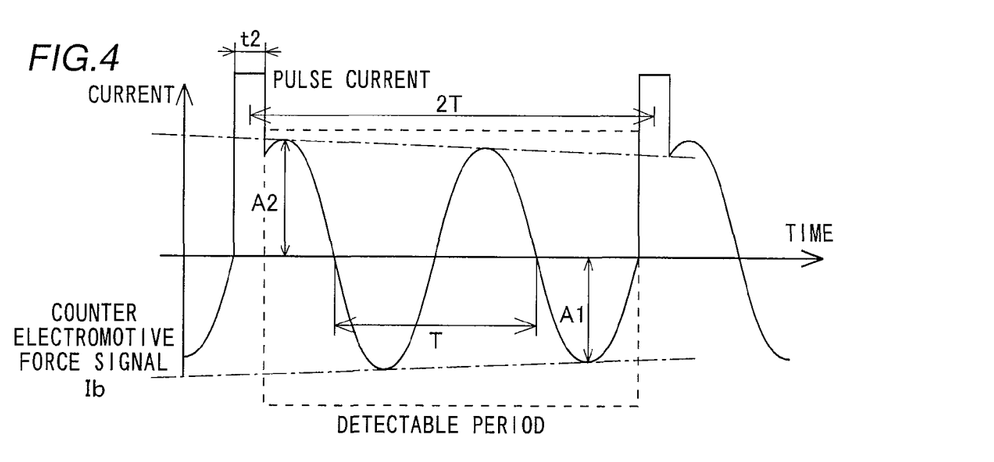
FIG. 4 is a diagram for illustrating detection of the counter electromotive force signal waveform at a second frequency in the electromagnetically driven mirror according to the embodiment of the present invention.

According to this embodiment, the pulse current Ip is supplied at the second frequency f2 in detection of the counter electromotive force signal Ib to extend the period of the free vibration of the movable portion 11 (the non-supply period of the pulse current Ip) as shown in FIG. 4, and hence the total quantity of the supplied pulse current Ip is reduced. In order to compensate for this reduction in the total quantity of the supplied pulse current Ip, the pulse width of the pulse current Ip is enlarged from the first pulse width t1 at the first frequency f1, thereby supplying the pulse current Ip having the second pulse width t2. The second pulse width t2 has a magnitude capable of maintaining the vibrational amplitude of the movable portion 11 substantially identical to the amplitude (A1) in the case of supplying the pulse current Ip of the first pulse width t1 at the first frequency f1 also in the free vibration (the non-supply period of the pulse current Ip), and is not more than substantially half the vibration cycle (T) of the movable portion 11. The upper limit of the pulse width of the pulse current Ip is so set to half the vibration cycle (T) of the movable portion 11 that the pulse current Ip is not supplied beyond half the vibration cycle (T) of the movable portion 11, whereby the pulse current Ip is not continuously supplied to suppress the vibration after the movable portion 11 reverses the rotational direction.

FIG. 4 shows the waveform of the counter electromotive force signal Ib detected at the second frequency f2. Referring to FIG. 4, the pulse current Ip is supplied at the second frequency f2 half the first frequency f1. At this time, the pulse current Ip is supplied in the cycle 2T, while the pulse width thereof is enlarged to the second pulse width t2. In this case, the movable portion 11 vibrating at the first frequency f1 (cycle T) is vibrated by the pulse current Ip once in two cycles. Also in detection of the counter electromotive force signal Ib, therefore, the movable portion 11 can continue the resonance vibration synchronous with the first frequency f1. Further, the pulse width is enlarged to the second pulse width t2, whereby the Lorentz force acts on the movable portion 11 with a longer time width (t2) due to the pulse current Ip. Therefore, the vibrational amplitude of the movable portion 11 is enlarged, and hence the vibration waveform of the detected counter electromotive force signal Ib has amplitude A2 larger than the amplitude A1 (see FIG. 2) in the case of vibrating with the pulse width t1. After excited by the pulse current Ip, the movable portion 11 performs free vibration for substantially two cycles while slightly damping in the non-supply period of the pulse current Ip. Immediately before a next pulse current Ip is supplied, the movable portion 11 reaches amplitude substantially identical to the amplitude A1 in the case where the pulse current Ip is supplied at the first frequency f1. Thus, the vibrational amplitude in the free vibration of the movable portion 11 (the non-supply period of the pulse current Ip) can be maintained and the overall shape of the counter electromotive force signal Ib for one cycle can be acquired also when the pulse current Ip is supplied at the second frequency f2.

Figure 5:
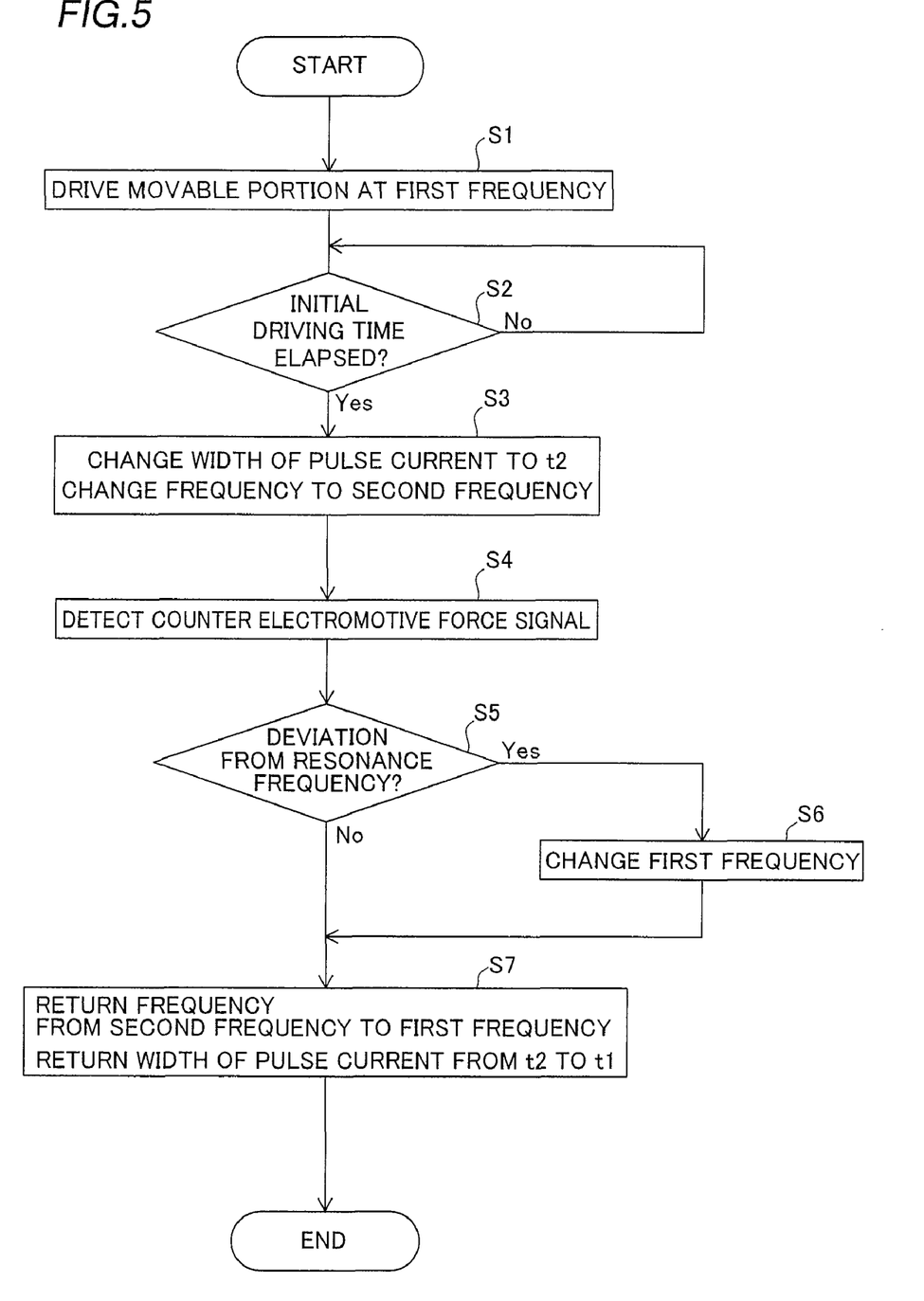
FIG. 5 is a flow chart for illustrating driving control of the electromagnetically driven mirror according to the embodiment of the present invention.

Resonance driving control of the electromagnetically driven mirror 100 according to the embodiment of the present invention is now described with reference to FIG. 5.

In starting of the electromagnetically driven mirror 100, the vibration of the movable portion 11 must be stabilized around the resonance frequency. At a step S1, therefore, the movable portion 11 is driven at the previously set first frequency f1, as shown in FIG. 2. At this time, the pulse current supply portion 32 supplies the pulse current Ip to the driving coil 13 at the first frequency f1 substantially equal to the resonance frequency of the movable portion 11 previously set in the main control portion 31. Then, the movable portion 11 starts vibrating at the first frequency f1 substantially coinciding with the resonance frequency due to the pulse current Ip supplied to the driving coil 31. In starting, the movable portion 11 is driven at the first frequency f1 for the prescribed initial driving time previously set in the main control portion 31, for stabilizing the vibrational state of the movable portion 11.

At a step S2, the main control portion 31 determines whether or not the previously set prescribed time has elapsed. If the set initial driving time has not elapsed, the pulse current supply portion 32 continuously supplies the pulse current Ip at the first frequency f1, thereby stabilizing the vibrational state of the movable portion 11.

If the set initial driving time has elapsed, the pulse current supply portion 32 changes the frequency of the supplied pulse current Ip from the first frequency f1 to the second frequency f2 (cycle 2T) on the basis of the control signal from the main control portion 31 at a step S3. Thus, the movable portion 11 continues the inertial free vibration over substantially two cycles due to the supply of the pulse current Ip. Following the change of the frequency to the second frequency f2, the pulse width of the supplied pulse current Ip is enlarged from the first pulse width t1 to the second pulse width t2. Immediately after the supply of the pulse current Ip, therefore, the counter electromotive force signal having the amplitude A2 larger than the amplitude A1 in the case of being excited with the first pulse width t1 is detected, while the resonance vibration is continued with slight damping due to the free vibration of the movable portion 11. Thus, the overall shape of the signal waveform (cycle T) of the counter electromotive force signal Ib for one cycle can be acquired while maintaining the vibrational amplitude of the movable portion 11 in the free vibration substantially identical to the vibrational amplitude in resonance driving.

At a step S4, the counter electromotive force detecting portion 33 detects the counter electromotive force signal Ib generated in the driving coil 13 in the free vibration of the movable portion 11 (the non-supply period of the pulse current Ip). The pulse current Ip and the counter electromotive force signal Ib are mixed in the signal waveform detected by the counter electromotive force detecting portion 33. However, the pulse current Ip supplied at the second frequency f2 has the cycle 2T while the freely vibrating movable portion 11 continues the resonance vibration (cycle T) by inertia as shown in FIG. 4, whereby the counter electromotive force signal Ib for one cycle can be detected between supplied respective pulse currents Ip. The counter electromotive force detecting portion 33 outputs the signal waveform of the detected counter electromotive force signal Ib to the main control portion 31.

When receiving the counter electromotive force signal Ib from the counter electromotive force detecting portion 33, the main control portion 31 acquires the actual vibration frequency and the vibrational amplitude of the movable portion 11 and a phase deviation from the supplied pulse current Ip from the signal waveform of the counter electromotive force signal Ib. At a step S5, the main control portion 31 determines whether or not the first frequency f1 for supplying the pulse current Ip and the resonance frequency of the movable portion 11 deviate from each other from the acquired data such as the vibration frequency of the movable portion 11. If the resonance frequency of the movable portion 11 deviates due to temperature change or the like, the main control portion 31 changes the first frequency f1 to match the same with the resonance frequency of the movable portion 11 deviating due to temperature change or the like at a step S6.

At a step S7, the main control portion 31 outputs the control signal to the pulse current supply portion 32 to return the supply of the pulse current Ip from the second frequency f2 to the first frequency f1 matched with the resonance frequency of the movable portion 11 and to return the pulse width of the pulse current Ip from the second pulse width t2 to the original first pulse width t1. On the basis of the control signal from the main control portion 31, the pulse current supply portion 32 supplies the pulse current Ip to the driving coil 13 at the first frequency matched with the deviating resonance frequency of the movable portion 11, thereby continuing the resonance driving of the movable portion 11.

If the resonance frequency of the movable portion 11 acquired from the waveform of the counter electromotive force signal Ib and the first frequency f1 for supplying the pulse current Ip do not deviate from each other at the step S5, on the other hand, the resonance driving is properly performed, and hence the main control portion 31 outputs the control signal to the pulse current supply portion 32 to return the frequency and the pulse width to the first frequency f1 and the first pulse width t1 respectively without changing the first frequency f1.

The main control portion 31 changes the supply of the pulse current Ip to the second frequency f2 and repeats the detecting operation of detecting the counter electromotive force signal Ib every lapse of the prescribed time. Thus, the overall shape of the signal waveform of the counter electromotive force signal Ib for one cycle can be reliably detected, and resonance driving matched with fluctuation of the resonance frequency of the movable portion 11 resulting from temperature change or the like is enabled. Thus, the electromagnetically driven mirror 100 performs the driving control.

According to this embodiment, as hereinabove described, the electromagnetically driven mirror 100 is so formed as to periodically supply the pulse current Ip at the second frequency f2 smaller than the first frequency f1 substantially identical to the resonance frequency of the movable portion 11 in detection of the counter electromotive force signal Ib in the movable portion 11, whereby the interval (cycle) for supplying the pulse current Ip can be widened beyond the cycle (T) of the resonance frequency of the movable portion 11 when detecting the vibrational state of the movable portion 11 (the counter electromotive force signal Ib). Thus, the detection period for the counter electromotive force signal Ib for detecting the vibrational state of the movable portion 11 can be lengthened as compared with a case of detecting the vibrational state in a supply interval for the pulse current Ip at the first frequency f1 substantially identical to the resonance frequency of the movable portion 11. Further, the period for detecting the vibrational state of the movable portion 11 (the detectable period for the counter electromotive force signal Ib) can be lengthened by simply supplying the pulse current Ip at the second frequency f2 smaller than the first frequency f1, whereby complication of the structure of the electromagnetically driven mirror 100 can be suppressed.

According to this embodiment, as hereinabove described, the counter electromotive force detecting portion 33 is so formed as to detect the vibrational state of the movable portion 11 by detecting the counter electromotive force signal Ib generated in the single driving coil 13 due to the vibration of the movable portion 11 in the magnetic field in the non-supply period of the pulse current Ip while the pulse current Ip is supplied to the single driving coil 13 at the second frequency f2 in detection of the vibrational state of the movable portion 11 (the counter electromotive force signal Ib). Thus, the detectable period for the counter electromotive force signal Ib can be extended beyond the cycle (T) of the resonance frequency of the movable portion 11 by supplying the pulse current Ip to the single driving coil 13 at the second frequency f2 smaller than the first frequency f1 substantially identical to the resonance frequency of the movable portion 11, whereby the vibrational state of the movable portion 11 can be easily detected.

According to this embodiment, as hereinabove described, the second frequency f2 is substantially half the first frequency f1 so that the pulse current Ip is supplied at the second frequency f2 once in two cycles of the first frequency f1 substantially identical to the resonance frequency of the movable portion 11, whereby the cycle (2T) of the supplied pulse current Ip is twice the cycle (T) of the resonance frequency of the movable portion 11. Thus, reduction in the supply of the pulse current Ip in the case of changing the frequency from the first frequency f1 to the second frequency f2 can be suppressed as compared with a case of changing the second frequency f2 to ⅓ or ¼ of the first frequency f1 while supplying the pulse current Ip synchronous with the resonance vibration, and the detectable period for the vibrational state of the movable portion 11 (the counter electromotive force signal Ib) can completely include one cycle (cycle T) in the resonance vibration. Consequently, the overall shape of the vibration waveform of the counter electromotive force signal Ib of the movable portion 11 for one cycle can be acquired while simplifying maintenance of the resonance vibration of the movable portion 11 at the first frequency f1.

According to this embodiment, as hereinabove described, the pulse current supply portion 32 is so formed as to supply the pulse current Ip with the second pulse width t2 having a larger time width than the first pulse width t1 of the pulse current Ip supplied at the first frequency f1 in detection of the vibrational state of the movable portion 11 (the counter electromotive force signal Ib), whereby the supply of the pulse current Ip reduced when supplied at the second frequency f2 as compared with the case where the same is supplied at the first frequency f1 substantially identical to the resonance frequency of the movable portion 11 can be compensated by broadening the pulse width beyond the first pulse width t1. Thus, the detection period for the vibrational state of the movable portion 11 can be lengthened while suppressing reduction in the amplitude of the movable portion 11 resulting from the pulse current Ip supplied at the second frequency f2.

According to this embodiment, as hereinabove described, the pulse current supply portion 32 is so formed as to supply the pulse current Ip with the second pulse width t2 having the time width not more than half the vibration cycle (T) of the movable portion 11 in detection of the vibrational state of the movable portion 11 (the counter electromotive force signal Ib) so that the pulse current Ip is not supplied beyond half the vibration cycle (T) of the movable portion 11 also when the pulse width is enlarged from the first pulse width t1 to the second pulse width t2, whereby no such inconvenience is caused that the vibration of the movable portion 11 is suppressed due to the pulse current Ip supplied beyond half the vibration cycle (T) of the movable portion 11. Thus, the amplitude can be easily maintained in detection of the vibrational state of the movable portion 11 (the counter electromotive force signal Ib).

According to this embodiment, as hereinabove described, the second pulse width t2 is set to have the time width (t2) for vibrating the movable portion 11 with the amplitude A2 substantially identical to the amplitude A1 of the vibration of the movable portion 11 in the case of supplying the pulse current Ip of the first pulse width t1 to the movable portion 11 at the first frequency f1 when supplying the pulse current Ip of the second pulse width t2 to the movable portion 11 at the second frequency f2 in the detection period (the non-supply period of the pulse current Ip) for the vibrational state of the movable portion (the counter electromotive force signal Ib), whereby vibrational amplitude substantially identical to the amplitude A1 in the resonance vibration of the movable portion 11 supplied with the pulse current Ip at the first frequency f1 can be maintained also in the detection period (the non-supply period of the pulse current Ip) for the vibrational state of the movable portion 11 (the counter electromotive force signal Ib) supplied with the pulse current Ip at the second frequency f2. Thus, the vibrational amplitude of the movable portion 11 can be inhibited from changing during detection of the vibrational state of the movable portion 11 (the counter electromotive force signal Ib) supplied with the pulse current Ip at the second frequency f2.

According to this embodiment, as hereinabove described, the counter electromotive force detecting portion 33 is so formed as to detect the vibrational state of the movable portion 11 (the counter electromotive force signal Ib) after the vibration of the movable portion 11 is stabilized at the first frequency f1 due to a lapse of the initial driving time after starting, whereby the vibrational state of the movable portion 11 (the counter electromotive force signal Ib) can be detected after shifting the vibrational state of the movable portion 11 to a stable resonance state (vibration at the first frequency f1) without detecting the instable vibrational state of the movable portion 11 (the counter electromotive force signal Ib) in starting.

According to this embodiment, as hereinabove described, the counter electromotive force detecting portion 33 is so formed as to detect the vibrational state of the movable portion 11 (the counter electromotive force signal Ib) after a lapse of the prescribed initial driving time from the start of supply of the pulse current Ib at the first frequency f1 after starting, whereby the vibrational state of the movable portion 11 (the counter electromotive force signal Ib) can be easily detected after shifting the vibrational state of the movable portion 11 to a stable resonance state (vibration at the first frequency f1) by driving the movable portion 11 at the first frequency f1 until the prescribed initial driving time elapses.

According to this embodiment, as hereinabove described, the main control portion 31 is so formed as to determine whether or not the prescribed initial driving time has elapsed for controlling the pulse current supply portion 32 to change the supply of the pulse current Ip to the movable portion 11 from the first frequency f1 to the second frequency f2 if the prescribed initial driving time has elapsed, whereby the pulse current supply portion 32 can easily change the supply of the pulse current Ib from the first frequency f1 to the second frequency f2 on the basis of the determination of the main control portion 31 as to whether or not the prescribed initial driving time has elapsed.

According to this embodiment, as hereinabove described, the main control portion 31 is so formed as to determine whether or not the first frequency f1 and the resonance frequency of the movable portion 11 deviate from each other on the basis of the results (the actual vibration frequency and the vibrational amplitude of the movable portion 11 and the phase deviation from the supplied pulse current Ip) of detection of the vibrational state of the movable portion 11 (the counter electromotive force signal Ib) during supply of the pulse current Ip at the second frequency f2 for matching the first frequency f1 with the resonance frequency of the movable portion 11 when the first frequency f1 and the resonance frequency of the movable portion 11 deviate from each other. When the resonance frequency is changed due to temperature change or the like in driving of the electromagnetically driven mirror 100 to reduce the vibrational amplitude of the movable portion 11, therefore, the first frequency f1 can be matched with the (changed) resonance frequency of the movable portion 11 on the basis of the results of detection during the supply of the pulse current Ip at the second frequency f2 having a long detection period, whereby the vibrational state of the movable portion 11 (the counter electromotive force signal Ib) can be precisely detected, while the vibration of the movable portion 11 can be maintained in the resonance state also when the resonance frequency is changed due to temperature change or the like.

According to this embodiment, as hereinabove described, the main control portion 31 is so formed as to repeat detection of the vibrational state of the movable portion 11 (the counter electromotive force signal Ib) during supply of the pulse current Ip at the second frequency f2 and matching of the first frequency f1 with the resonance frequency of the movable portion 11 every lapse of the prescribed time. Also when the resonance frequency of the movable portion 11 is changed due to temperature change or the like to change the vibrational state of the movable portion 11 in continuation of the driving of the electromagnetically driven mirror 11, therefore, the main control portion 31 can periodically detect the vibrational state of the movable portion 11 (the counter electromotive force signal Ib) for matching the first frequency f1 for supplying the pulse current Ip with the resonance frequency every lapse of the prescribed time. Thus, the vibration of the movable portion 11 can be maintained in the resonance state also in continuation of the driving of the electrically driven mirror 100.

Although the present invention has been described and illustrated in detail, it is clearly understood that the same is by way of illustration and example only and is not to be taken by way of limitation, the spirit and scope of the present invention being limited only by the terms of the appended claims.

For example, while the above embodiment has been described with reference to the electromagnetically driven mirror 100 employed as an exemplary vibrating element according to the present invention, the present invention is not restricted to this but is also applicable to a vibrating element such as an electromagnetic actuator other than the electromagnetically driven mirror 100. In this case, a movable portion may not be so formed as to vibrate around rotating shafts but may be formed in a cantilever manner or a pendular manner, for example, and may be vibrated by a pulse current supplied to a driving coil.

While the movable portion 11 of the electromagnetically driven mirror 100 is driven by the Lorentz force generated by the driving coil 13 supplied with the pulse current Ip in the magnetic field in the aforementioned embodiment, the present invention is not restricted to this but the movable portion 11 may alternatively be driven by electromagnetic force other than the Lorentz force or force other than the electromagnetic force.

While the counter electromotive force detecting portion 33 is so formed as to detect the counter electromotive force signal Ib generated by the driving coil 31 moving in the magnetic field following the inertial free vibration of the movable portion 11 in the aforementioned embodiment, the present invention is not restricted to this but the detecting portion may alternatively be so formed as to detect a physical quantity other than the counter electromotive force signal. The detecting portion may simply be so formed as to detect the vibrational state of the movable portion 11.

While the second frequency f2 is half the first frequency f1 in the aforementioned embodiment, the present invention is not restricted to this but the second frequency may simply be smaller than the first frequency. The movable portion may be driven at the second frequency smaller than the first frequency substantially identical to the resonance frequency of the movable portion in detection of the vibrational state of the movable portion so that the detectable period for the vibrational state of the movable portion can be extended. When the second frequency is set to a level allowing detection of the vibrational state of the movable portion for at least one cycle, the overall shape of the vibration waveform of the movable portion for one cycle can be acquired, whereby the vibrational state of the movable portion can be more correctly detected.

When the second frequency is set to 1/n (n: integer of at least 2) of the first frequency, the pulse current can be supplied synchronously with the first frequency while the overall shape of the vibration waveform of the movable portion can be detected. Thus, the vibrational amplitude of the movable portion can be easily maintained by continuing the resonance vibration of the movable portion.

Figure 6:
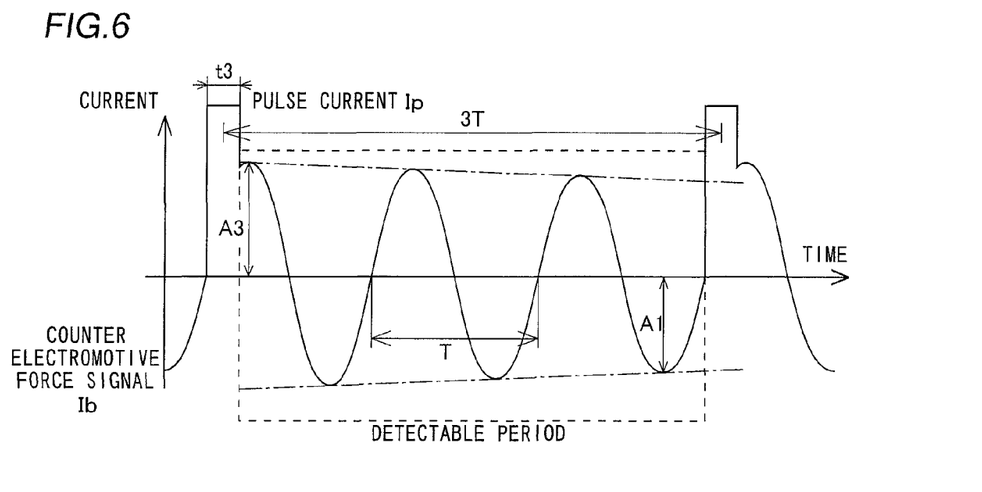
FIG. 6 is a diagram for illustrating detection of a counter electromotive force signal waveform at a second frequency according to a first modification of the electromagnetically driven mirror according to the embodiment of the present invention.

In a first modification of the embodiment shown in FIG. 6, the pulse current Ip is supplied at a second frequency f3 of about ⅓ of the first frequency f1 thereby detecting the counter electromotive force signal Ib. According to the first modification, the pulse current supply portion 32 supplies the pulse current Ip with a cycle 3T while the pulse width is enlarged to a second pulse width t3 in detection of the counter electromotive force signal Ib. The second pulse width t3 is greater than the second pulse width t2 (t2<t3), in order to compensate for reduction of the supplied pulse current Ip. Also in this case, the movable portion 11 vibrating at the first frequency f1 (cycle T) is supplied with the pulse current IP once in three cycles. Also in detection of the counter electromotive force signal Ib, therefore, the movable portion 11 can continue resonance vibration synchronous with the first frequency f1. The pulse width is enlarged to the second pulse width t3, whereby amplitude A3 of the detected counter electromotive force signal Ib is larger than the amplitude A2 (see FIG. 4) in the case where the pulse current Ip is supplied with the pulse width t2. In the non-supply period of the pulse current Ip after the supply of the pulse current Ip, the movable portion 11 performs free vibration for about three cycles while gradually damping. Thus, the detectable period for the counter electromotive force signal Ib (the non-supply period of the pulse current Ip) can be further extended. When the movable portion 11 is driven at the second frequency f3, the period of the free vibration of the movable portion 11 for extending the detectable period for the counter electromotive force signal Ib is lengthened and the waveform of the counter electromotive force signal Ib gradually damps, while the amplitude of the movable portion 11 driven at the first frequency f1 can be maintained by enlarging the pulse width to the second pulse width t3.

Thus, the second frequency f3 is so set to about ⅓ of the first frequency f1 that the pulse current Ip is supplied at the second frequency f3 (cycle 3T) once in three cycles of the first frequency f1 substantially identical to the resonance frequency of the movable portion 11, whereby the cycle (3T) of the supplied pulse current Ip is three times the cycle (T) of the resonance frequency of the movable portion 11. Therefore, the detectable period for the vibrational state of the movable portion 11 completely includes one cycle (T) in the resonance vibration while the pulse current Ip is supplied synchronously with the resonance vibration. Thus, the overall shape of the vibration waveform of the movable portion 11 for one cycle (T) can be acquired while maintaining the resonance vibration of the movable portion 11 at the first frequency f1.

While the movable portion 11 is driven at the first frequency f1 for the prescribed initial driving time previously set in the main control portion 31 in order to stabilize the vibration of the movable portion 11 around the resonance frequency in starting of the electromagnetically driven mirror 100 in the aforementioned embodiment, the present invention is not restricted to this but the movable portion 11 may not be driven at the first frequency f1 for the prescribed initial driving time in starting. The counter electromotive force detecting portion can detect the waveform of a part of the counter electromotive signal also in driving at the first frequency. In starting, therefore, the pulse current may be supplied at the first frequency, and the main control portion may be so formed as to determine whether or not the vibration of the movable portion has been stabilized around the resonance frequency on the basis of the waveform of the part of the counter electromotive force signal detected by the counter electromotive force detecting portion. When the vibration has been stabilized, the frequency and the pulse width may be changed to the second frequency and the second pulse width, and the overall shape of the counter electromotive force signal waveform for one cycle may be detected.

Figure 7:
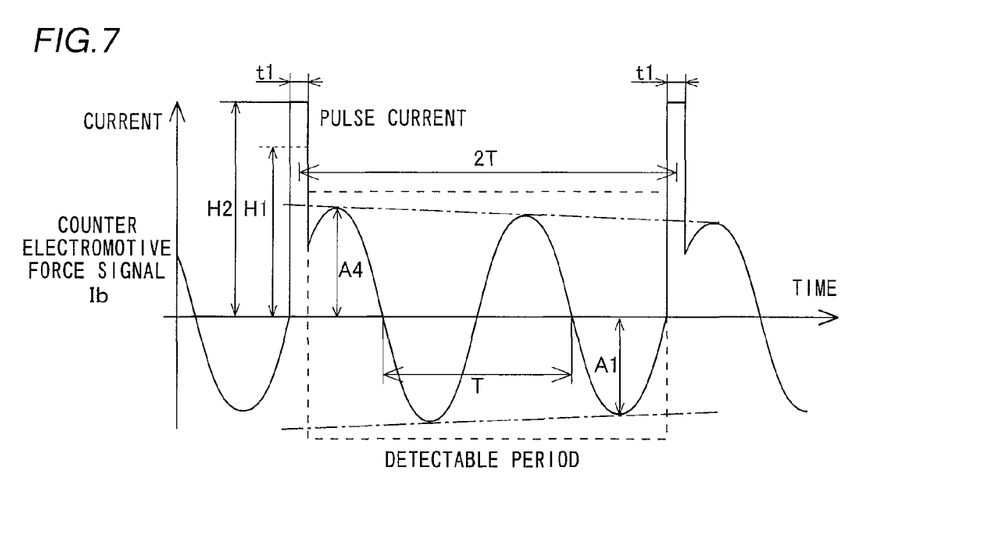
FIG. 7 is a diagram for illustrating detection of a counter electromotive force signal waveform at a second frequency according to a second modification of the electromagnetically driven mirror according to the embodiment of the present invention.

While the pulse width of the supplied pulse current Ip is enlarged so that the pulse current Ip having the second pulse width t2 is supplied in detection of the counter electromotive force signal Ib in the aforementioned embodiment, the present invention is not restricted to this but the pulse width of the supplied pulse current Ip may be changed as in a second modification of the embodiment shown in FIG. 7. According to the second modification, the pulse current Ip is supplied at the second frequency f2 (cycle 2T) while the pulse amplitude of the pulse current Ip is changed from H1 (see FIG. 2) to H2 in detection of the counter electromotive force signal Ib. Referring to FIG. 7, H1 denotes the pulse amplitude of the pulse current Ip supplied at the first frequency f1. Also in this case, an effect similar to that in the case of enlarging the pulse width can be attained. In other words, the pulse amplitude of the supplied pulse current Ip is so enlarged to the pulse amplitude H2 that amplitude A4 of the detected counter electromotive force signal Ib is larger than the amplitude A1 in the case where the same is supplied with the pulse amplitude H1. After the pulse current Ip is supplied to the driving coil 13, the movable portion 11 performs free vibration for substantially two cycles while slightly damping in the non-supply period of the pulse current Ip. At this time, the pulse amplitude is so enlarged that the amplitude of the counter electromotive force signal Ib immediately before supply of a next pulse current Ip is substantially identical to the amplitude upon supply of the next pulse current Ip in the case of driving the movable portion 11 at the first frequency f1. Thus, the vibrational amplitude in the free vibration of the movable portion 11 (the non-supply period of the pulse current Ip) can be maintained, and the overall shape of the counter electromotive force signal Ib for one cycle can be acquired. Alternatively, both of the pulse amplitude and the pulse width may be changed.

While the pair of permanent magnets 23a and 23b are so formed as to generate the magnetic field acting on the driving coil 13 in the aforementioned embodiment, the present invention is not restricted to this but the magnetic field may alternatively be generated by magnetic field generating portions such as electromagnets other than the permanent magnets.

While the movable portion 11 is in the form of a rectangular flat plate in plan view in the aforementioned embodiment, the present invention is not restricted to this but the movable portion may alternatively be in the form of a circle or a square.

What is claimed is:

1. A vibrating element comprising:
   a movable portion driven to vibrate at a prescribed resonance frequency;
   a driving portion vibrating said movable portion by cyclically supplying a pulse signal; and
   a detecting portion detecting the vibrational state of said movable portion, wherein
   said driving portion is so formed as to supply said pulse signal at a first frequency substantially identical to said resonance frequency of said movable portion at least in starting and to cyclically supply said pulse signal at a second frequency smaller than said first frequency in detection of the vibrational state of said movable portion, and
   said vibrating element is so formed as to repeat detection of the vibrational state of said movable portion during supply of said pulse signal at said second frequency and matching of said first frequency with said resonance frequency of said movable portion on the basis of the detected vibrational state of said movable portion every lapse of a prescribed time.

2. The vibrating element according to claim 1, wherein said second frequency is a frequency allowing detection of the vibrational state of said movable portion for at least one cycle.

3. The vibrating element according to claim 1, further comprising:
   a magnetic field generating portion generating a magnetic field, and
   a single driving coil arranged in said magnetic field and supplied with said pulse signal by said driving portion thereby vibrating said movable portion, wherein
   said detecting portion is so formed as to detect the vibrational state of said movable portion by detecting counter electromotive force generated in said single driving coil due to vibration of said movable portion in said magnetic field in a non-supply period of said pulse signal while said pulse signal is supplied to said single driving coil at said second frequency in detection of the vibrational state of said movable portion.

4. The vibrating element according to claim 2, wherein said second frequency is substantially 1/n, where n is an integer of at least two, of said first frequency.

5. The vibrating element according to claim 4, wherein said second frequency is substantially half said first frequency.

6. The vibrating element according to claim 1, wherein said driving portion is so formed as to supply said pulse signal with a second pulse width having a larger time width than a first pulse width of said pulse signal supplied at said first frequency in detection of the vibrational state of said movable portion.

7. The vibrating element according to claim 6, wherein said driving portion is so formed as to supply said pulse signal with said second pulse width having a time width of not more than substantially half the vibration cycle of said movable portion in detection of the vibrational state of said movable portion.

8. The vibrating element according to claim 6, wherein said second pulse width has a time width for vibrating said movable portion with amplitude substantially identical to the amplitude of vibration of said movable portion in the case of supplying said pulse signal of said first pulse width to said movable portion at said first frequency when supplying said pulse signal of said second pulse width to said movable portion at said second frequency in a detection period for the vibrational state of said movable portion.

9. The vibrating element according to claim 1, wherein said detecting portion is so formed as to detect the vibrational state of said movable portion after vibration of said movable portion is stabilized at said first frequency after starting.

10. The vibrating element according to claim 9, wherein said detecting portion is so formed as to detect the vibrational state of said movable portion after a lapse of a prescribed initial driving time from the start of supply of said pulse signal at said first frequency after starting.

11. The vibrating element according to claim 10, further comprising a driving control portion controlling said driving portion, wherein
    said driving control portion is so formed as to determine whether or not said prescribed initial driving time has elapsed for controlling said driving portion to switch the supply of said pulse signal to said movable portion from said first frequency to said second frequency when said prescribed initial driving time has elapsed.

12. The vibrating element according to claim 11, wherein said driving control portion is so formed as to determine whether or not said first frequency deviates from said resonance frequency of said movable portion on the basis of a result of detection of the vibrational state of said movable portion during supply of said pulse signal at said second frequency for matching said first frequency with said resonance frequency of said movable portion when said first frequency deviates from said resonance frequency of said movable portion.

13. The vibrating element according to claim 1, wherein said movable portion includes a mirror integrally vibrating with said movable portion thereby changing an angle of reflection of applied light.

14. A method of controlling vibration of a vibrating element, comprising the steps of:
    supplying a pulse signal at a first frequency substantially identical to a resonance frequency of a movable portion at least in starting; and
    detecting the vibrational state of said movable portion while cyclically supplying said pulse signal at a second frequency smaller than said first frequency;
    wherein said vibrating element is so formed as to repeat detection of the vibrational state of said movable portion during supply of said pulse signal at said second frequency and matching of said first frequency with said resonance frequency of said movable portion on the basis of the detected vibrational state of said movable portion every lapse of a prescribed time.

15. The method of controlling vibration of a vibrating element according to claim 14, wherein
said second frequency is a frequency allowing detection of the vibrational state of said movable portion for at least one cycle.

16. The method of controlling vibration of a vibrating element according to claim 15, wherein
said second frequency is substantially 1/n, where n is an integer of at least two, of said first frequency.

17. The method of controlling vibration of a vibrating element according to claim 16, wherein
said second frequency is substantially half said first frequency.

18. The method of controlling vibration of a vibrating element according to claim 14, wherein
the step of detecting the vibrational state of said movable portion includes a step of detecting the vibrational state of said movable portion while supplying said pulse signal with a second pulse width having a larger time width than a first pulse width of said pulse signal supplied at said first frequency.

19. The method of controlling vibration of a vibrating element according to claim 18, wherein
the step of detecting the vibrational state of said movable portion includes a step of detecting the vibrational state of said movable portion while supplying said pulse signal with said second pulse width having a time width of not more than substantially half the vibration cycle of said movable portion.

20. A vibrating element comprising:
a movable portion driven to vibrate at a prescribed resonance frequency;
a driving portion vibrating said movable portion by cyclically supplying a pulse signal; and
a detecting portion detecting the vibrational state of said movable portion;
wherein said driving portion is so formed as to supply said pulse signal at a first frequency substantially identical to said resonance frequency of said movable portion for a pre-set initial driving time, said pre-set initial driving time being the time required to stabilize the vibrational state of said movable portion, and, after said pre-set initial driving time has elapsed, to cyclically supply said pulse signal at a second frequency smaller than said first frequency to enable detection of the vibrational state of said movable portion by said detecting portion.

* * * * *